May 14, 1935.  F. M. GORE  2,001,677
WIRE BELT
Filed March 22, 1934   3 Sheets-Sheet 1

Inventor
Frealon Michael Gore
by Murray G. Boyer
Atty.

May 14, 1935.  F. M. GORE  2,001,677
WIRE BELT
Filed March 22, 1934   3 Sheets-Sheet 2

Inventor
Frealon Michael Gore
by Murray C. Boyer
Atty.

Inventor
Frealon Michael Gore

Patented May 14, 1935

2,001,677

UNITED STATES PATENT OFFICE 2,001,677

WIRE BELT

Frealon Michael Gore, Oaklyn, N. J., assignor to Audubon Wire Cloth Corporation, Audubon, N. J., a corporation of New Jersey Application March 22, 1934, Serial No. 716,913

23 Claims. (Cl. 245—6)

My invention relates to woven wire belts, and more particularly to a type composed of a plurality of interlocking, helically coiled wires.

It is a common practice in the manufacture of these helical wire belts to provide sections where the helices extend in one direction and other sections where the helices extend in another direction, and to provide means for connecting these several sections.

Other belts are made continuous with the helices running in one direction, and still other belts—notably that forming the subject of the application of Raymond J. Guba, filed December 18, 1933, Serial No. 702,969,—are made of two sets of helically twisted wires so that, upon each face of said belt, groups of helices of the respective wires extend in different directions and are alternately disposed, such construction comprising what may be termed a duplex belt composed of two sets of helically twisted wires.

In all of these belts, there has been a tendency to stretch or elongate, and various means have been proposed from time to time to prevent such stretching or elongation.

The object of my invention is to provide means that will effect this desired result and, at the same time, provide a reinforced selvage at the edges of the fabric, such selvage protecting the edges of the belt and also increasing the tensile strength of the belt structure.

For the purpose of reinforcing the edges and providing the desired selvage designed to protect such belt edges and, at the same time, prevent elongation, I introduce at the ends of the helically disposed cross-wires making up the belt, short helically coiled wires which may extend inwardly from such edge a suitable distance, which may range approximately from one to six inches, although these are not necessarily the limits for belts of various widths.

In all instances, these belts are made of helically coiled wires, and the helices of the respective wires are either right hand or left hand. In a belt made up entirely of right hand spirals, for instance, the extra reinforcing wires at the edges of the same to form the desired selvages may be left hand spirals. In like manner, if the belt is made up of left hand spirals, the short reinforcing wires at the edges of the same to form the desired selvages may be right hand spirals. It will be understood, of course, that I may introduce short reinforcing wires having the same spiral winding as the wires of which the belt is composed, without departing from the scope of my invention.

A further object of my invention is to introduce these short wires which serve in the nature of a reinforcement at a point or points intermediate the edges or selvages of the belt, the groups of wires so introduced extending in lines parallel with the longitudinal axis of the belt. They may be of any suitable length, preferably not less than three or four coils or helices, and, by reason of the flattened condition of the helices, they will remain in any position in which they are originally placed. The short wires so disposed provide means resisting elongation of the belt intermediate the edges.

In order that there shall be no tendency of the introduced wires, whether at the selvages or at any point or points intermediate the same, to shorten the belt, these introduced wires have helices slightly longer longitudinally of the belt than the helices of the cross-wires which make up the belt.

When these introduced wires are employed to provide the desired selvages, pairs of the same are locked at their ends at the edges of the belt independently of the connections for pairs of the helically twisted cross-wires which make up the belt. This insures absolute flexibility of the selvages which will be of the same character as the flexibility of the main portion of the belt, and insures that such belt may freely run over the rollers upon which it is mounted for movement.

While the selvages are usually made up of the short wires, each of the same length arranged in pairs and interlaced with the belt wires in a manner substantially identical with the arrangement disclosed in the belt forming the subject of the application of Raymond J. Guba, hereinabove referred to, it may be desirable to introduce at intervals pairs of longer wires—that is to say, wires that extend further toward the center of the belt—all of which is within the scope of my invention.

The various features of my invention are more fully described hereinafter, reference being had to the accompanying drawings, more or less diagrammatic in character, in which.

Figure 1:
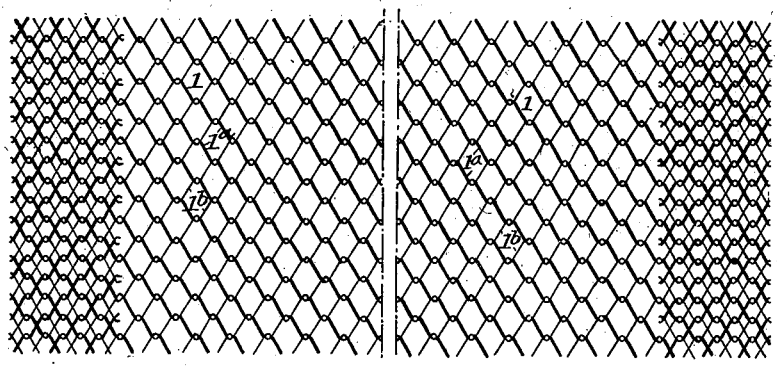
Figure 1 is a diagrammatic plan view of a portion of a belt made up of helically twisted cross-wires all running in the same direction with reinforced selvages made up of short helically twisted wires interlaced with the ends of the belt wires, said selvage-forming wires having their convolutions extending in a direction opposite to that of the convolutions of the belt wires.
Figure 2:
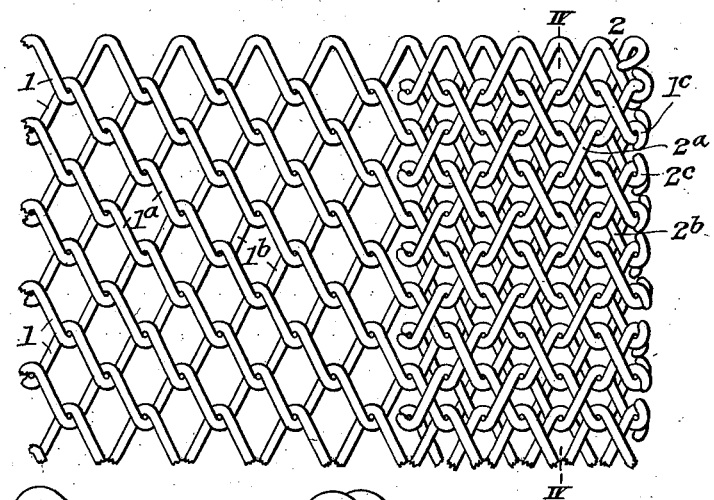
Fig. 2 is a fragmentary view, on a larger scale, of a portion of the belt shown in Fig. 1.
Figure 3:
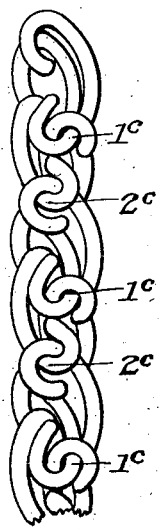
Fig. 3 is an edge view of a portion of Fig. 2 on a still larger scale.
Figure 4:
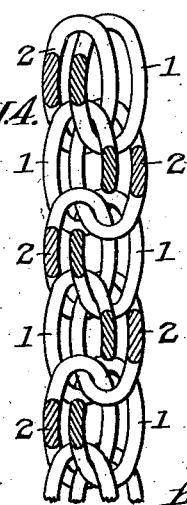
Fig. 4 is a sectional view on the line IV—IV, Fig. 2 on the same scale as Fig. 3.
Figure 5:
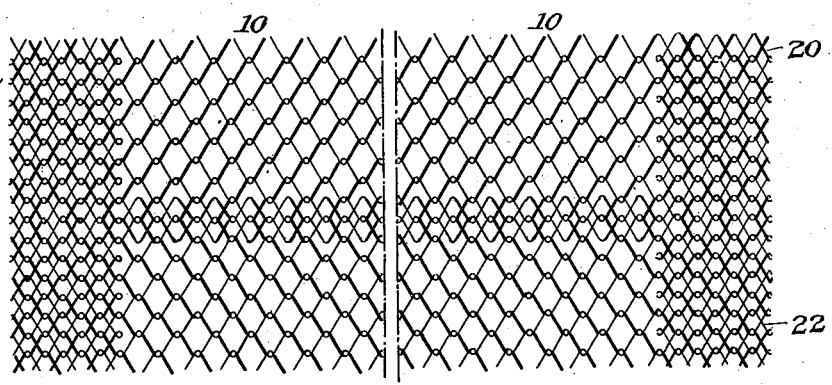

Fig. 5 is a diagrammatic plan view of a portion of a belt made up of sections of helically twisted cross-wires having convolutions disposed in opposite directions; that is to say, such belt is made of sections longitudinally of the belt in which the convolutions of the helically twisted wires of one section are dextrorsal or extend to the right alternated with other sections longitudinally of the belt in which the convolutions of the helically twisted wires are sinistrorsal or extend to the left, the wires of the several sections having short helically twisted wires interlaced with the ends of the same to form selvages of a type substantially like those illustrated in Figs. 1 and 2.

Figure 6:
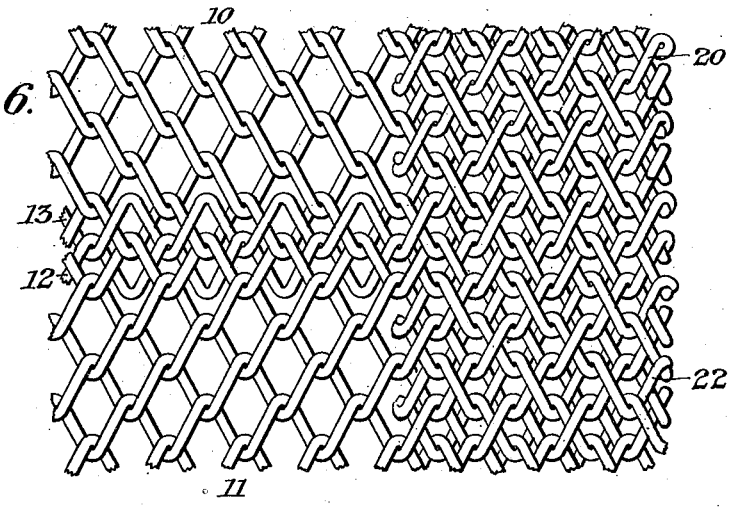

Fig. 6 is a fragmentary view on a larger scale of a portion of the belt shown in Fig. 5 illustrating the junction between sections of the same.

Figure 7:
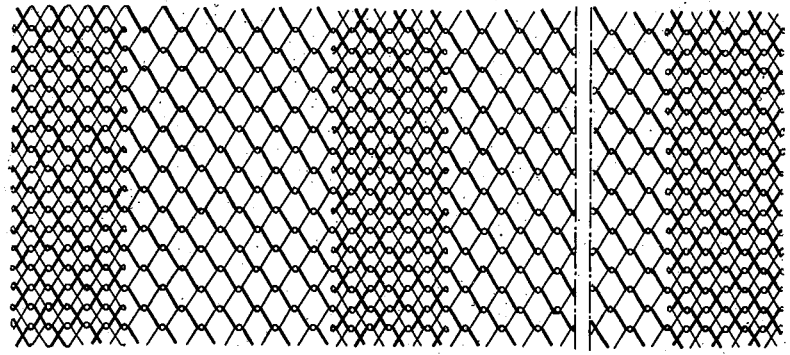

Fig. 7 is a diagrammatic view showing short helically twisted reinforcing wires interlaced with the helically twisted cross-wires making up the belt and disposed intermediate the side or marginal edges of the latter.

Figure 8:
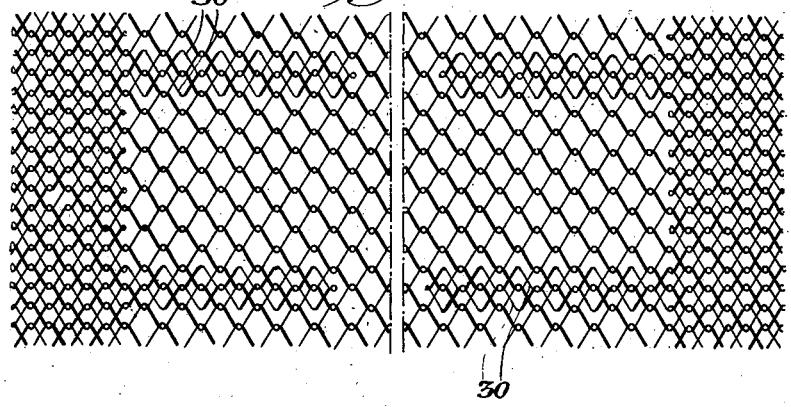
Figure 9:
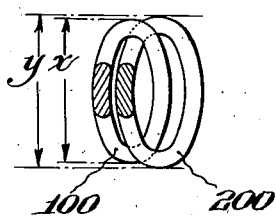

Fig. 8 is a view of the belt with a selvage of substantially the same type as those illustrated in the other views of the drawing but in which longer helically twisted strands are arranged at intervals for reinforcing the same, and Fig. 9 is a diagrammatic view illustrating a detail of my invention.

In Figs. 1 and 2 of the drawings, the helically twisted wires making up the belt are indicated at 1, and the upper and lower portions of the helices are indicated at 1ª and 1ᵇ, respectively. The helices of one surface of the belt lie or extend in one direction, and on the opposite surface of the belt, they lie or extend in the opposite direction, and this is true whether the convolutions of the wires ar dextrorsal or sinistrorsal.

In Fig. 1 the cross-wires making up the belt are of the dextrorsal type, and the upper portions of the respective helices lie in a diagonal plane extending from the lower right to the upper left in each wire. These wires have their ends secured together at 1ᶜ in a manner common in the production of belts of this type. The reinforcing or selvage-forming wires are indicated at 2, the upper and lower parts of the helices being indicated at 2ª and 2ᵇ. These wires also have their ends secured together as at 2ᶜ at the margins or edges of the belts so that complete flexibility of the belt is preserved. The inner ends of these reinforcing or selvage-forming wires lie between the upper and lower portions of the helices of the same as well as those of the belt wires, and do not project beyond either surface of the belt.

My improved selvage, consisting of the short helically twisted wires may be applied to a type of belt of the character shown in Figs. 5 and 6, which is made up of alternating sections of wires whose helices extend in opposite directions; that is to say, one section—the upper portion of Fig. 6, for instance—consists of helically twisted wires, indicated at 10, of right hand or dextrorsal twist or weave, while the helically twisted wires of the alternate or next adjacent section—the lower portion of Fig. 5—consists of helically twisted wires, indicated at 11, of left hand or sinistrorsal twist or weave. These sections are joined by a pair of helically twisted wires 12 and 13, the wire 12 having a right hand or dextrorsal twist, while the wire 13 has a left hand or sinistrorsal twist.

The selvage for the type of belt shown in Figs. 5 and 6 is formed of short wires 20 and 22, of the same type as those employed with the form of belt shown in Figs. 1 and 2, the short wires 20, interlaced with the ends of the right hand or dextrorsal wires at the marginal edges of the belt, being shown as of sinistrorsal or left hand twist, while the short wires 22, interlaced with the ends of the sinistrorsal or left hand wires of the other section, having a right hand or dextrorsal twist.

For the purpose of longitudinally reinforcing the belt and holding the same in a taut condition during travel over rollers which impart movement to the same, I may introduce the short helically twisted wires in the body of the belt at a point or points intermediate the marginal edges of the same, and an arrangement of this character is indicated in Fig. 7. The number of these longitudinal rows of short helically twisted reinforcing wires will depend in large measure upon the width of the belt, it being desirable to employ a greater number with wide belts. With narrow belts up to some dimensions, a single line of these short reinforcing wires will probably be sufficient, especially in connection with the reinforced selvages.

In some instances, it may be desirable to extend pairs of these reinforcing wires inwardly of the edge of the belt at intervals to an extent greater than the majority of these reinforcing or selvage-forming wires, and such an instance is illustrated at 30 in Fig. 8.

While the gauge of wire employed in making the helically coiled reinforcing or selvage-forming wires may be, and in most instances is, the same as the helically twisted cross-wires making up the belt, it is necessary, in order to preserve the normal length of the belt and prevent such selvage-forming wires tending to shorten the edges, to make the helices thereof somewhat greater than the helices of the cross-wires. This condition is due to the fact that, in interlacing these short wires, wires having helices of the same size as the cross-wires would tend to bind or crimp the latter to a certain extent. While this binding effect for individual pairs of wires is probably infinitesimal—a few thousandths of an inch, more or less—it may become a serious factor in a belt of some length, and, unless avoided by the use of wires of slightly larger helices for the short reinforcing and selvage-forming members, would shorten the edges of the belt and cause the central unreinforced portion to be loose. I have illustrated this feature of reinforcing wires having larger helices diagrammatically and in somewhat exaggerated form in Fig. 9, in which the belt wire is indicated at 100, and the short reinforcing or selvage-forming wire is indicated at 200, the difference in length or extent of helices being indicated at "X" and "Y".

It is preferable to have, and in the several views of the drawings I have shown, the short helically twisted reinforcing or selvage-forming wires as having a twist the reverse of the helically twisted belt wires with which they are interlaced. It is within the scope of my invention, however, to employ these short helically twisted or reinforcing wires having a twist extending in the same direction as the belt wires with which they are interlaced.

A further feature of having the convolutions of the reinforcing wires extend in a direction opposite to the convolutions of the belt wires, in the manner illustrated in the drawings, is that such arrangement will help to prevent the belt moving diagonally—one side or the other, depending upon the helical twist—when passing over the driving rollers.

In some instances, I may employ helically twisted wires of one gauge in cross section for the cross-wires making up the belt, and wires of different gauge in cross-section—larger or smaller, depending upon the conditions and the function the belt is to perform—for the short helically twisted reinforcing wires.

By reason of the reinforcement of the marginal edges and/or reinforcement of the cross-wires of the belt intermediate such marginal edges, such as I have provided, substantially all of the slack in a belt made of helically twisted wires is taken out and there is, practically, no tendency of a belt reinforced in accordance with my invention to elongate in use.

While I have shown certain more or less specific embodiments of my invention, it will be obvious that various modifications may be made therein without departing from the spirit and scope thereof, all of which is intended to be covered by the appended claims.

I claim:

1. A belt made of helically twisted interlocking wires coiled in one direction having a selvage made up of short helically twisted interlocking wires coiled in another direction and interlaced with the end portions of the interlocking belt wires.

2. A belt made of sections of helically twisted interlocking wires coiled in one angular direction alternated with sections of helically twisted wires coiled in an opposite angular direction having a selvage made up of short helically twisted interlocking wires interlaced with the end portions of the interlocking belt wires of the several sections.

3. A belt made up of helically twisted interlocking wires having their ends connected in pairs and a selvage for said belt extending longitudinally of the same and comprising short helically twisted interlocking wires interlaced with the end portions of the interlocking belt wires, said selvage-forming wires having their outer ends connected in pairs in line with the connections for the belt wires and independently thereof.

4. A belt made up of helically twisted interlocking wires with convolutions coiled in one angular direction having their ends connected in pairs; and a selvage for said belt extending longitudinally of the same and comprising short helically twisted interlocking wires interlaced with the end portions of the interlocking belt wires, said selvage-forming wires having their outer ends connected in pairs in line with the connections for the belt wires and independently thereof and having their convolutions coiled in an angular direction opposite to that of the belt wires.

5. A belt made of helically twisted interlocking wires disposed at right angles to the longitudinal axis of the belt and having their ends connected in pairs; and longitudinally arranged selvages for said belt comprising a plurality of short helically twisted interlocking wires interlaced with the ends of the cross-wires forming said belt and independently connected in pairs.

6. A belt made of helically twisted interlocking wires disposed at right angles to the longitudinal axis of the belt; and having their ends connected in pairs; and longitudinally arranged selvages for said belt comprising a plurality of short helically twisted interlocking wires interlaced with the ends of the cross-wires forming said belt and independently connected in pairs, the belt wires and selvage-forming wires having their convolutions oppositely disposed.

7. A belt made of helically twisted interlocking wires disposed crosswise of such belt and at right angles to the longitudinal axis thereof; and selvages for said belt comprising short helically twisted wires interlocked with each other and interlaced with the end portions of said belt wires, said selvages having a thickness greater than the major portion of said belt intermediate the selvages.

8. A belt made of helically twisted interlocking wires disposed crosswise of such belt and at right angles to the longitudinal axis thereof; and selvages for said belt comprising short helically twisted wires interlocked with each other and interlaced with the end portions of the belt wire; said short wires holding the wires of the major portion of said belt in spaced relation.

9. A belt made of helically twisted interlocking wires disposed crosswise of said belt and at right angles to the longitudinal axis thereof; and selvages for said belt made up of short interlocking helically twisted wires disposed at the respective ends of the cross-wires and interlaced therewith, said selvage-forming wires being twisted in a direction opposite to the twisting of the belt wires.

10. A belt made of helically twisted interlocking wires disposed crosswise of said belt and at right angles to the longitudinal axis thereof; and selvages for said belt made up of short interlocking helically twisted wires disposed at the respective ends of the cross-wires and interlaced therewith, said selvage-forming wires being twisted in a direction opposite to the twisting of the belt wires and having their inner ends lying between the upper and lower surfaces of the convolutions of said belt wires.

11. A reinforcement for the edges of belts made up of helically twisted cross-wires; said reinforcement consisting of a plurality of short helically twisted wires interlocked with each other and interlaced with the end portions of the cross-wires at the edges of said belt.

12. A reinforcement for the edges of belts made up of helically twisted interlocking cross-wires; said reinforcement consisting of a plurality of short helically twisted wires interlocked with each other and interlaced with the end portions of the cross-wires at the edges of said belt, said sets of wires having their ends connected together in pairs independently of each other.

13. A reinforcement for the edges of belts made up of helically twisted cross wires; said reinforcement consisting of a plurality of short helically twisted wires interlocked with each other and interlaced with the cross-wires at the edges of said belt, said short wires having their helices disposed at angles different from those of the main wires of the belt.

14. A reinforcement for the edges of belts made up of helically twisted cross interlocking wires; said reinforcement consisting of a plurality of short helically twisted wires interlocked with each other and interlaced with the end portions of said cross wires at the edges of said belt, said short wires having their helices disposed at angles different from those of the main wires of the belt.

15. As a new article of manufacture, a belt made up of helically twisted wires with the helices running in one direction and having their ends connected together; and short wires interlaced with the ends of said wires at the edges of the belt made up of said cross-wires with their helices extending in a direction opposite to the helices of the cross-wires, said short wires having their ends connected together at the marginal edges of the belt.

16. As a new article of manufacture, a belt made up of helically twisted wires with the helices running in one direction and having their ends connected together; and short helically twisted wires interlaced with the ends of said wires at the edges of the belt made up of said cross-wires, said short wires having their ends connected together at the marginal edges of the belt and having their inner ends terminating between the surfaces of the upper and lower helices of the wires which make up the belt.

17. As a new article of manufacture, a belt made up of helically twisted cross wires in interlocked relation; and groups of short wires interlocked with each other and interlaced with the belt wires and extending longitudinally of the belt, at least one of said short wire groups being intermediate the edges of said belt formed by the end portions of said cross-wires.

18. As a new article of manufacture, a belt made up of a plurality of helically twisted cross wires of identical convolutions in interlocked relation, and a plurality of interlocked short wires of convolutions different than the belt wires interlaced with the same and extending longitudinally of the belt; said short wires being disposed intermediate the sides or marginal edge portions of the belt.

19. As a new article of manufacture, a belt made up of a plurality of helically twisted wires of identical convolutions in interlocked relation, and groups of short wires of convolutions different than the belt wires interlaced with the same and extending longitudinally of the belt, at least one of said groups of short wires being intermediate the ends of said wires at the edges of the belt.

20. A woven wire belt made of helically twisted interlocking strands with convolutions of a definite and regular dimension and having a selvage formed of short helically twisted interlocking strands interlaced with the ends of the interlocking belt strands; the convolutions of said selvage-forming strands being slightly greater in extent than the convolutions of the belt-forming strands interlaced therewith.

21. A woven wire belt made of helically twisted interlocking strands having convolutions of a regular dimension longitudinally of the belt; said belt having selvages formed of short helically twisted interlocking strands interlaced with the ends of the interlocking belt strands and having convolutions of regular dimensions longitudinally of the belt and of slightly greater extent than the convolutions of the belt-forming strands interlaced therewith.

22. A woven wire selvaged belt made up of a plurality of sets of helically twisted interlocking strands each having convolutions of regular dimensions longitudinally of the belt; one set of said strands extending the full width of the belt and another set of said interlocking strands being shorter than the full-width belt strands and located at a marginal edge of the belt and interlaced with said full-width strands; said shorter strands having convolutions larger than the convolutions of the full-width strands.

23. A woven wire selvaged belt made up of a plurality of sets of helically twisted interlocking strands each having convolutions of regular dimensions longitudinally of the belt; one set of said strands extending the full-width of the belt and a plurality of other sets of said interlocking strands shorter than the full-width strands and interlaced with the first-named set of strands at the marginal edges of the belt; said shorter strands having larger convolutions than the full-width strands.

FREALON MICHAEL GORE.